United States Patent [19]

Iwabuchi et al.

[11] 4,399,190
[45] Aug. 16, 1983

[54] THIN INSULATING MICA SHEET AND INSULATED COIL

[75] Inventors: Tadashi Iwabuchi, Nagasaki; Osamu Hayashi, Amagasaki, both of Japan

[73] Assignee: Mitsubishi Denki Kabushiki Kaisha, Tokyo, Japan

[21] Appl. No.: 343,765

[22] Filed: Jan. 28, 1982

[30] Foreign Application Priority Data

Mar. 11, 1981 [JP] Japan .................................. 56-36103
Mar. 11, 1981 [JP] Japan .................................. 56-36105

[51] Int. Cl.³ ............................................. B32B 5/16
[52] U.S. Cl. .................................... 428/336; 428/363; 428/449; 428/415; 428/454; 428/473.5; 428/474.7; 428/480; 174/110 R; 174/120 SR
[58] Field of Search ........... 428/363, 449, 415, 473.5, 428/474.7, 480, 454, 336

[56] References Cited

U.S. PATENT DOCUMENTS 3,998,963 12/1976 Smith ................................... 428/363
4,046,938 9/1977 Torossian et al. ........... 428/473.5 X
4,247,364 1/1981 Culp .................................... 428/454
4,264,669 4/1981 Yuan ........................... 428/473.5 X
4,304,818 12/1981 Hirata et al. ................. 428/473.5 X

FOREIGN PATENT DOCUMENTS 55-19723 2/1980 Japan ................................... 428/363

OTHER PUBLICATIONS

Conductfol ®. Conducttherm ®. "Single Conductor Insulation of High Voltage Machines Using Mica Tapes" by SIEMENS; 14th EIC (1979) pp. 76–79.
Micafold ®. ASEA Catalogue. "Newly Developed Turn Insulation for Large, High–Voltage Machines" by L-G Virsberg, M.Sc. and A Bjorklund; OK000-I 13 E (1977); pp. 1–6.

Primary Examiner—P. Ives
Attorney, Agent, or Firm—Oblon, Fisher, Spivak, McClelland & Maier

[57] ABSTRACT

A thin insulating sheet comprises an associated mica sheet containing 1 to 9 wt. % of a polymer fibril which is melt-bonded to a polymer film or a porous polymer sheet and impregnated with a resin in a prepreg form.

8 Claims, 1 Drawing Figure

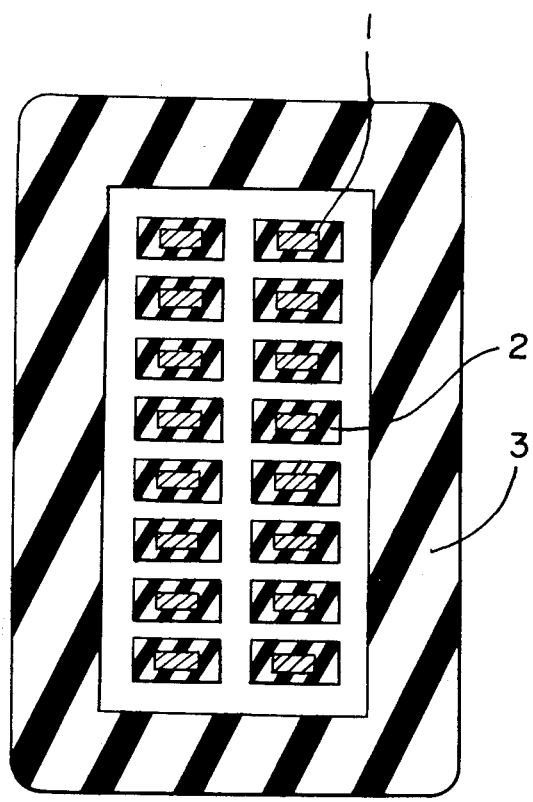

THIN INSULATING MICA SHEET AND INSULATED COIL

BACKGROUND OF THE INVENTION

1. Field of the Invention

The present invention relates to a thin insulating sheet and to a novel insulated coil. More particularly, it relates to a thin insulating sheet for a bare conductor insulation or a turn insulation of a coil of an electric instrument.

2. Description of the Prior Art

The insulating structure shown in the FIGURE has been known. FIG. 1 is a sectional view of a coil. In the FIGURE, the reference numeral (1) designates a bare conductor; (2) designates a bare conductor insulating part; (3) an earth main insulating layer. A potential formed between the bare conductors (1) is maintained by the bare conductor insulating part or the turn insulating part (2) and a potential formed between the earth and the bare conductor is maintained by the earth main insulating layer (3).

As the bare conductor insulating part or the turn insulating part (2), a duplex glass winding, an enamel baked or enamel undercoat baked duplex glass winding, a film tape winding, and a mica tape winding have been employed. The duplex glass winding or the enamel baked or enamel undercoat baked duplex glass winding for the bare conductor insulating part or the turn insulating part has inferior corona discharge resistance in comparison with the mica tape winding.

The conventional mica tape winding as the bare conductor insulating part or the turn insulating part causes thick thickness of the tape to occupy a large space for the insulation and to give inferior space factor and to be uneconomical.

In order to overcome these disadvantages, it has been proposed to use an associated mica paper and as an insulating material. The associated mica paper has superior heat resistance and electric insulating property such as corona discharge resistance and has been widely used. However, it has weak strength and the mica flake is easily removed to require special careful handling of the sheet since flaky mica is sheeted without a binder. When the associated mica paper is used as the insulating material, it has been indispensable to give certain structural strength by bonding the insulating substrates with a varnish or a binder.

SUMMARY OF THE INVENTION

It is an object of the present invention to overcome the disadvantages and to provide a thin insulating sheet for an insulated coil having excellent electric characteristics, heat resistance and impregnancy.

The foregoing and other objects of the present invention have been attained by providing a thin insulating sheet obtained by melt-bonding an associated mica sheet containing 1 to 9 wt.% of polymer fibril to a polymer film or a porous polymer sheet and treating with a resin in a prepreg form. The thin insulating sheet is used for the bare conductor insulation or the turn insulation.

BRIEF DESCRIPTION OF THE DRAWING

The FIGURE is a sectional view of a conventional insulated coil.

DETAILED DESCRIPTION OF THE PREFERRED EMBODIMENTS

In the present invention, a thin insulating sheet is produced by using an associated mica sheet made of flaky mica containing polymer fibril at a content of 1 to 9 wt.% and a polymer film or a porous polymer sheet by melt-bonding and treating with a resin in a prepreg form. An insulated coil having excellent electric characteristic heat resistance and impregnancy can be obtained by using the thin insulating sheet. The associated mica sheet can be produced in a thin thickness of 15–40 μm which could not be given by the conventional associated mica sheet.

The polymer fibril (pulp) used in the present invention can be fibrous particles having many projections or ribbon type particles which form a paper by a wet paper sheeting machine. For example, a solution of an aromatic polymer is mechanically stirred in a precipitating medium. In the sheeting by using the pulp and the mica flake, it is possible to add an aromatic staple fiber (0.5–1.0 denier; filament fineness of 0.2–15μ; staple length of 1–15 mm) at a content of 1.5–4.0 wt.%.

The aromatic polymer can be aromatic polyamides having an aromatic main chain having units represented by the formula (1) or (2):

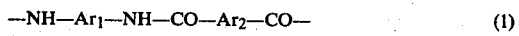

wherein $Ar_1$, $Ar_2$ and $Ar_3$ are the same or different and respectively represent di-valent aromatic group. The typical aromatic polyamides include poly(m-phenyleneisophthalamide), poly(m-phenyleneterephthalamide); poly(p-phenyleneisophthalamide) and poly(p-phenyleneterephthalmide). The polymer can be a copolymer or can contain a non-aromatic component.

The resulting associated mica sheet is melt-bonded to a polymer film such as a heat resistant polymer film or a porous polymer sheet by heat-pressing whereby a thin insulating sheet for the coil insulation can be continuously produced without using a binder such as a varnish or an adhesive composition.

The heat resistant polymer film used for the melt-bond can be a polyimide film (trade name KAPTON manufactured by E. I. DuPont); a polyparabanic acid film (trade name TREDLON manufactured by Exxon Chemical Co.); a polyamide film (trade name A film manufactured by Nitto Denki Kogyo); and a polyester film (manufactured by Diafoil Co., Ltd.).

A content of the polymer fibril incorporated into the associated mica sheet is preferably in a range of 1–9 wt.%. When it is less than 1 wt.%, the strength of the associated mica sheet is too low and the mica flake is easily peeled off whereas when it is more than 9 wt.%, electric characteristics especially long charged life characteristic are adversely affected to be unfavorable.

The porous polymer sheet is preferably a porous aromatic polyamide paper and also can be produced by using fibril made of a polyester, phenol resin or polyacrylonitrile etc.

The resulting heat resistant sheet is treated with a thermosettable resin such as a polyimide resin, a triazine resin, a silicone resin and an epoxy resin by coating and drying it by a coating machine to obtain a heat resistant prepreg sheet. It is also possible to laminate the associated mica sheet to the heat resistant polymer film or the porous polymer sheet under the resin coating by a coating machine. A content of the resin used for treating the sheet is preferably in a range of 30 to 50 wt.% preferably 30 to 40 wt.% in the coating in view of excellent characteristics given in the use of the sheet for the insulation of the coil.

The present invention will be further illustrated by certain examples.

EXAMPLES 1 TO 6

Each associated mica sheet containing 1-5 wt.% of aromatic polyamide fibril shown in Table 1 was melt-bonded to a polyimide film (KAPTON) (40-60 g/m² or 25-45 g/m²) to produce each mica sheet having a thickness of 35-65 μm and a mica content of more than 50 wt.%.

A composition of an impregnation epoxy resin (Epon 828 manufactured by Shell Chemical Co.) and an acid anhydride curing agent (HN 2200 manufactured by Hitachi Kasei Kogyo with 0.5 PHR of benzyl dimethyl-amine) was immersed into the mica sheet at a content of the epoxy resin of 30 to 45 wt.% (based on the content of mica) in a prepreg form to obtain a mica tape.

Each coil was prepared by winding each mica sheet on a bare conductor at predetermined turns and heat-pressing it. A prepreg insulation layer as the main insulation was formed and heat-cured to obtain each insulated coil having a bare conductor and turn insulation which had excellent heat resistance and electric characteristics. The characteristics of the resulting insulated coils are shown in Table 1.

REFERENCE 1

An enamel undercoat duplex glass winding sheet (PEW/DGC: manufactured by Dainichi Nippon Densen) was used as a thin sheet and glass fiber was used instead of mica in a preparation of an insulated coil. The characteristics of the resulting insulated coils are shown in Table 1.

REFERENCE 2

A polyester back mica tape (manufactured by Kobishi Denki) was used as film backing associated mica tape at a content of mica shown in Table 1 in the structure of the thin sheet to obtain an insulated coil. The characteristics of the resulting insulated coil are shown in Table 1.

In Table 1, as the dielectric breakdown strength of the coil, the characteristic after treating with the epoxy type resin is shown in the upper part and the characteristic in the non-impregnation is shown in parentheses, (), in the lower part.

TABLE 1

| | Exp. 1 | Exp. 2 | Exp. 3 | Exp. 4 |
|---|---|---|---|---|
| Structure of thin sheet: | | | | |
| Associated mica sheet (μm) | 38.7 (fibril 3%) | 43.6 (fibril 5%) | 44.2 (fibril 7%) | 39.2 (fibril 3%) |
| Heat resistant polymer film (μm) | PIM (1 mil) | PIM (1 mil) | PIM (1 mil) | PES (1 mil) |
| Total thickness (μm) | 70 | 74 | 78 | 78 |
| Content of mica (wt. %) | 53.8 | 51.0 | 50.3 | 54.0 |
| Characteristics: | | | | |
| Tensile strength (kg/20 mm wide) | 7.8 | 7.8 | 8.2 | 7.5 |
| Thickness of insulator after winding on conductor: | | | | |
| Half lap winding 1 turn (μm) | 142 | 145 | 149 | 150 |
| Half lap winding 2 turn (μm) | 278 | 285 | 293 | 274 |
| Dielectric breakdown strength of coil: | | | | |
| Half lap winding 1 turn (kV) | 12 | 12 | 12.5 | 12.5 |
| Half lap winding 2 turn (kV) | 22.0 | 23.5 | 24.0 | 22.5 |
| Content of epoxy resin immersed for prepreg of epoxy resin | 35 | 33 | 38 | 32 |

TABLE 1'

| | Exp. 5 | Exp. 6 | Ref. 1 | Ref. 2 |
|---|---|---|---|---|
| Structure of thin sheet: | | | | |
| Associated mica sheet (μm) | 43.7 (fibril 5%) | 43.6 (fibril 5%) | *1 | *2 |
| Heat resistant polymer film (μm) | PES (1 mil) | polyether film (1 mil) | | |
| Total thickness (μm) | 75 | 75 | — | 150 |
| Content of mica (wt. %) | 51.4 | 50.8 | (glass content) 40-70 | 52.5 |
| Characteristics: | | | | |
| Tensile strength (kg/20 mm wide) | 7.8 | 8.4 | — | 8.55 |
| Thickness of insulator after winding on conductor: | | | | |
| Half lap winding 1 turn (μm) | 148 | 145 | (thickness) 195 | 158 |
| Half lap winding 2 turn (μm) | 290 | 283 | | 315 |
| Dielectric breakdown strength of coil: | | | | |
| Half lap winding 1 turn (kV) | 12.5 | 13.0 | (dielectric breakdown strength) 15.0 | 13.0 (6.8) |
| Half lap winding 2 turn (kV) | 22.0 | 24.5 | | 21.0 (12.5) |
| Content of epoxy resin immersed for prepreg of epoxy resin | 35 | 35 | — | — |

Note:
*1 Duplex glass wound of enamel undercoat DGC
*2 Film backing associated mica sheet wound
PIM: polyimide film
PES: polyethyleneterephthalate film

EXAMPLE 7 TO 12

Each associated mica sheet containing 1 to 9 wt.% of aromatic polyamide fibril shown in Table 2 was melt-bonded to each aromatic polyamide paper (40-60 g/m² or 25-45 g/m²) to produce each mica tape having a thickness of 35-65 μm and a mica content of more than 50 wt.%.

A composition of an impregnation epoxy resin (Epon 828 manufactured by Shell Chemical Co.) and an acid anhydride curing agent (HN-2200 manufactured by Hitachi Kasei Kogyo with 0.5 PHR of benzyl dimethyl-amine) was immersed into the mica sheet at a content of the epoxy resin of about 40 wt.% (based on the content of mica) in a prepreg form to obtain a mica tape. Each coil was prepared by winding each mica tape on a bare conductor at predetermined turns and heat-pressing it. A prepreg insulation layer as the main insulation was formed and heat-cured to obtain each insulating coil having a bare conductor and turn insulation which had excellent heat resistance and electric characteristics. The characteristics of the resulting insulated coils are shown in Table 2.

TABLE 2

|  | Exp. 7 | Exp. 8 | Exp. 9 | Exp. 10 |
|---|---|---|---|---|
| Structure of thin sheet: | | | | |
| Associated mica sheet (μm) | 32.5 (fibril 5%) | 43.6 (fibril 5%) | 45.1 (fibril 5%) | 43.0 (fibril 7%) |
| Aromatic polyamide paper (μm) | 21.5 | 20.7 | 20.5 | 20.5 |
| Total thickness (μm) | 60 | 72 | 75 | 73 |
| Content of mica (wt. %) | 50.1 | 52.5 | 53.8 | 51.8 |
| Characterisitics: | | | | |
| Tensile strength (kg/20 mm wide) | 5.9 | 7.5 | 8.1 | 7.7 |
| Thickness of insulator after winding on conductor: | | | | |
| Half lap winding 1 turn (μm) | 117 | 139 | 145 | 142 |
| Half lap winding 2 turn (μm) | 230 | 275 | 288 | 280 |
| Dielectric breakdown strength of coil: | | | | |
| Half lap winding 1 turn (kV) | 9.8 | 10.5 | 12.5 | 11.0 |
| Half lap winding 2 turn (kV) | 19.0 | 19.5 | 25.0 | 21.5 |
| Content of epoxy resin or triazine resin | epoxy resin 33% | epoxy resin 35% | epoxy resin 35% | triazine resin 35% |

TABLE 2'

|  | Exp. 11 | Exp. 12 | Ref. 1 | Ref. 2 |
|---|---|---|---|---|
| Structure of thin sheet: | | | | |
| Associated mica sheet (μm) | 45.0 (fibril 9%) | 38.7 (fibril 3%) | *1 | *2 |
| Aromatic polyamide paper (μm) | 20.2 | 20.2 | | |
| Total thickness (μm) | 73 | 64 | — | 150 |
| Content of mica (wt. %) | 50.2 | 50.8 | (glass content) 40-70 | 52.5 |
| Characteristics: | | | | |
| Tensile strength (kg/20 mm wide) | 7.9 | 6.3 | — | 8.55 |
| Thickness of insulator after winding on conductor: | | | | |
| Half lap winding 1 turn (μm) | 145 | 127 | (thickness) 195 | 158 |
| Half lap winding 2 turn (μm) | 285 | 255 | | 315 |
| Dielectric breakdown strength of coil: | | | | |
| Half lap winding 1 turn (kV) | 11.2 | 10.0 | (dielectric breakdown strength) 15.0 | 13.8 (6.8) |
| Half lap winding 2 turn (kV) | 21.8 | 19.0 | | 21.0 (12.5) |
| Content of epoxy resin or triazine resin | triazine resin | triazine resin | — | — |

TABLE 2'-continued

|  | Exp. 11 | Exp. 12 | Ref. 1 | Ref. 2 |
|---|---|---|---|---|
| | 35% | 35% | | |

Note:
*1 Duplex glass wound of enamel undercoat DGC
*2 Film backing associated mica sheet wound
PIM: polyimide film
PES: polyethyleneterephthalate film In the examples, 1 turn-half lap wound conductor and 2 turn-half lap wound conductor were employed for the tape winding. Thus, it is possible to employ an edge lap wound conductor or a simplex wound conductor depending upon a thickness of the insulating sheet, a dielectric breakdown strength and a size of a conductor. A number of turns of an insulated conductor can be also selected as desired. In the embodiment, a main insulating layer was formed around the insulated conductor. Thus, the present invention can be also applied for the insulated conductor to which a main insulation is not applied.

In accordance with the present invention, a thin mica tape having high strength obtained by melt-bonding an associated mica sheet containing polymer fibril to a heat resistant polymer sheet or a porous polymer sheet and treating with a resin in a prepreg form is wound on a conductor thereby providing an insulated coil which has excellent heat resistance and corona discharge resistance, and a high space factor and is economical. Thus, the insulated coil of the present invention has remarkably high value in an industrial field.

We claim:
1. A thin insulating sheet which comprises an associated mica sheet containing 1 to 9 wt.% of a polymer fibril which is melt-bonded to a polymer film without using a binder, the melt-bonded composite having a thickness of 35-65 μm, and impregnated with a resin in a prepreg form, wherein said polymer film is selected from the group consisting of a polyimide film, a polyparabanic acid film, a polyamide film and a polyester film.

2. The thin insulating sheet according to claim 1 wherein said polymer fibril is a pulp made of an aromatic polyamide.

3. The thin insulating sheet according to claim 2, wherein the aromatic polyamide has repeating units represented by the formula (1) or (2):

$$-NH-Ar_1-NH-CO-Ar_2-CO- \quad (1)$$

$$-NH-Ar_3-CO- \quad (2)$$

wherein $Ar_1$, $Ar_2$ and $Ar_3$ are the same or different and represent a di-valent aromatic group.

4. The thin insulating sheet according to claim 3, wherein said aromatic polyamide is selected from the group consisting of poly(m-phenyleneisophthalamide), poly(m-phenyleneterephthalamide), poly(p-phenyleneisophthalamide) and poly(p-phenyleneterephthalamide).

5. The thin insulating sheet according to claim 1 wherein said resin for impregnation is a thermosettable resin selected from the group consisting of a polyimide resin, a triazine resin, a silicone resin and an epoxy resin.

6. The thin insulating sheet according to claim 5, wherein said resin for impregnation is present in an amount of 30 to 50 wt.%.

7. The thin insulating sheet according to claim 6, wherein said resin for impregnation is present in an amount of 30 to 40 wt.%.

8. An insulated coil which comprises a thin insulating sheet obtained by melt-bonding an associated mica sheet containing 1 to 9 wt.% of a polymer fibril to a polymer film, without using a binder, and impregnating with a resin in a prepreg form which is used for a bare conductor insulation or a turn insulation.

* * * * *